United States Patent [19]
Brunton et al.

[11] 3,840,302
[45] Oct. 8, 1974

[54] OSCILLOSCOPE PRESENTATION OF SHEET PROFILE FROM A SCANNING GAGE

[75] Inventors: Donald C. Brunton, Columbus; Frank E. Huffman, Worthington, both of Ohio

[73] Assignee: Infra Systems, Inc., Columbus, Ohio ; by The City National Bank & Trust Company of Columbus, executor of Donald C. Brunton, deceased

[22] Filed: Jan. 5, 1973

[21] Appl. No.: 321,151

Related U.S. Application Data

[63] Continuation of Ser. No. 149,033, June 1, 1971, abandoned, which is a continuation of Ser. No. 751,911, Aug. 12, 1968, abandoned.

[52] U.S. Cl................. 356/167, 356/199, 250/563
[51] Int. Cl. .......................................... G01b 11/00
[58] Field of Search...................... 356/167, 199, 51; 250/71.5 S, 83.5 D, 219 TH; 73/159; 315/22; 178/6.8

[56] References Cited
UNITED STATES PATENTS
3,299,205  1/1967  Stavis................................. 178/6.8

*Primary Examiner*—Ronald L. Wibert
*Assistant Examiner*—Paul K. Godwin
*Attorney, Agent, or Firm*—Munson H. Lane; C. Henry Peterson; Allan M. Lowe

[57] ABSTRACT

An apparatus for visual presentation of sheet profiles, comprising a sheet scanning gauge of a type which produces an electrical signal which is a function of a selected variable property of a sheet over its width and length, a signal processor which develops a usable electric signal which is a function of the variable property, a signal storage device which stores the signal from each transverse scan of the sheet, a signal readout device which readsout the stored signals from a plurality of consecutive transverse scans of the sheet, and a cathode ray tube display device which accepts signals from the signal readout device and pressure a visual display of the sheet profile for a plurality of transverse scans made by the scanning gauge.

30 Claims, 4 Drawing Figures

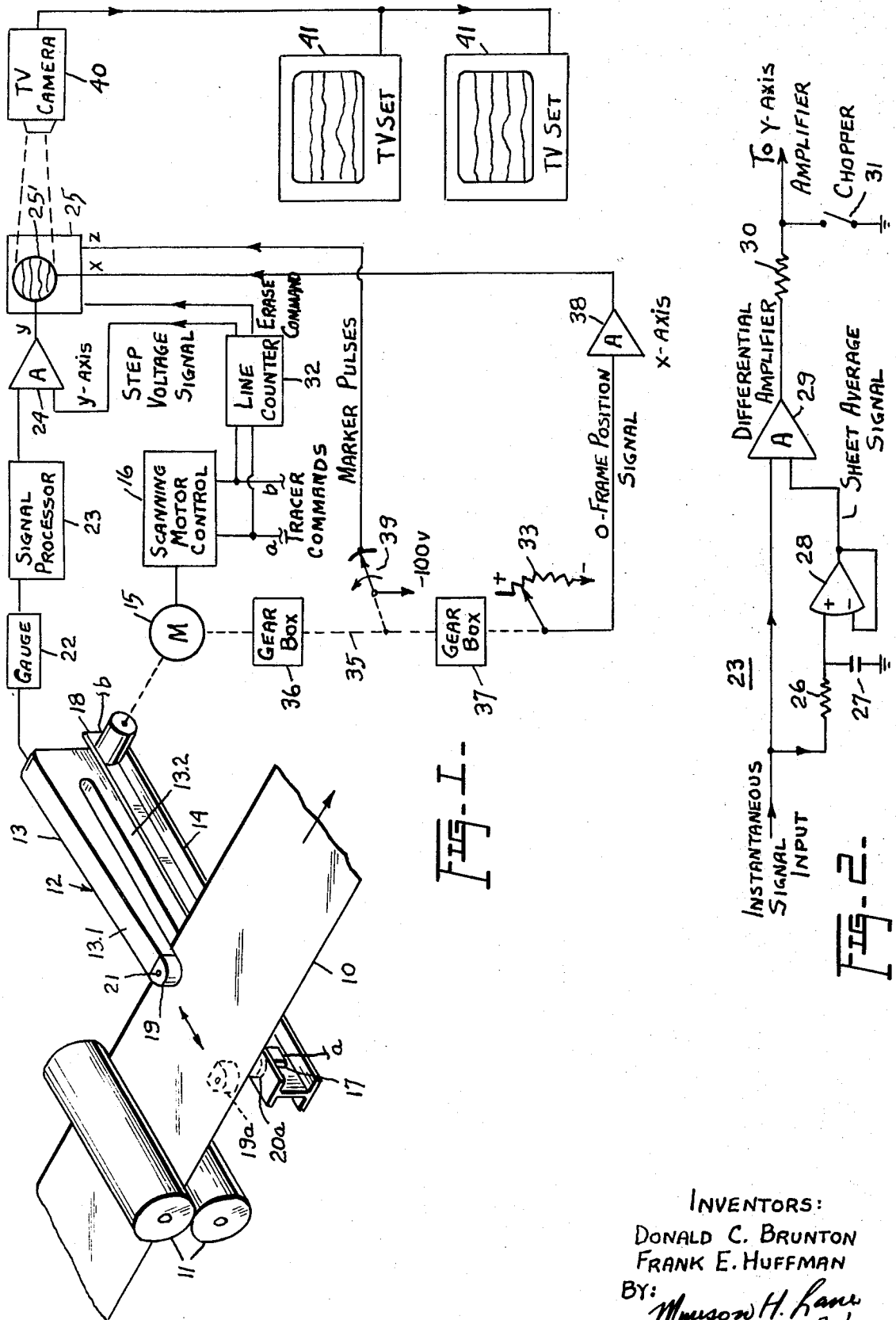

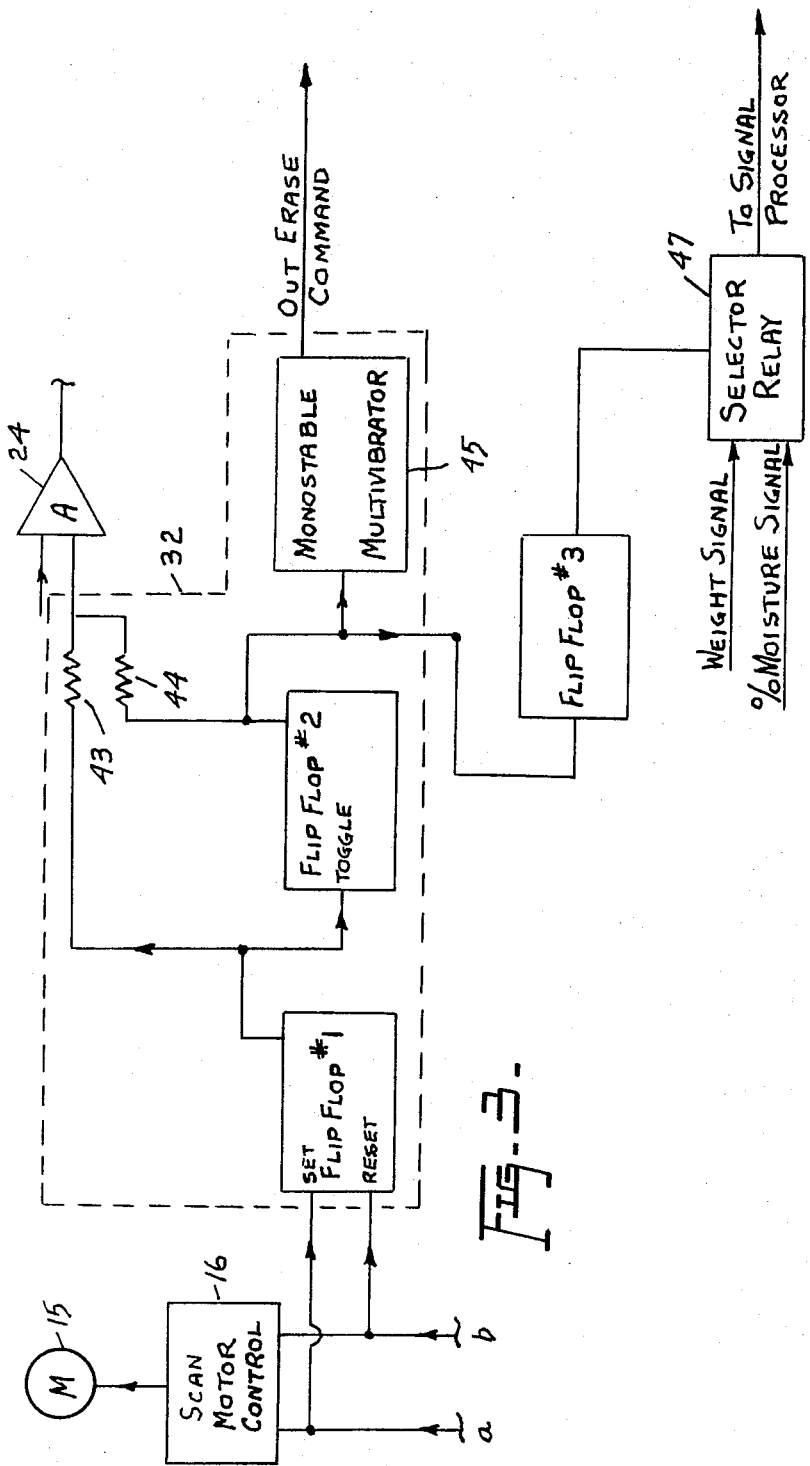

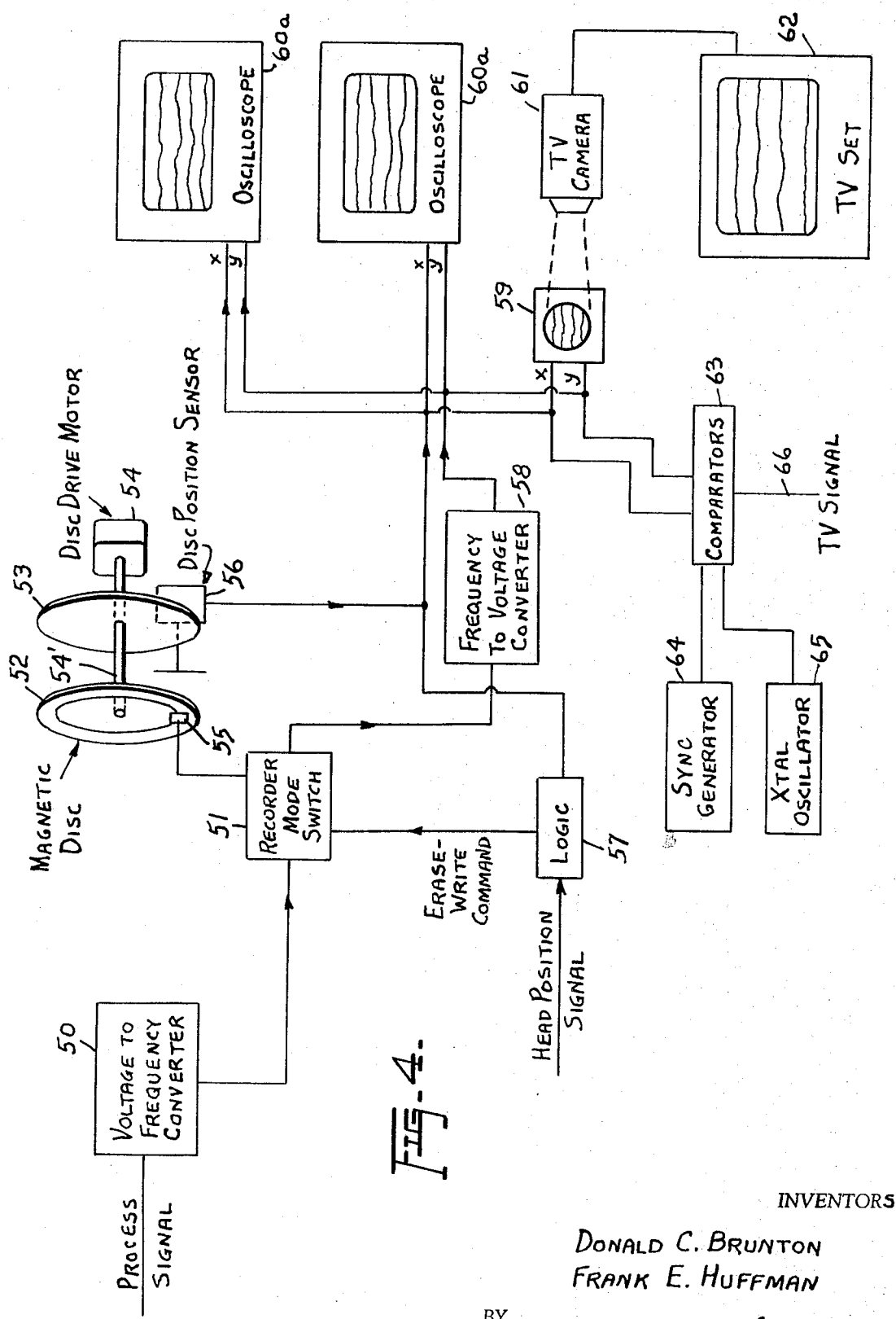

OSCILLOSCOPE PRESENTATION OF SHEET PROFILE FROM A SCANNING GAGE

This is a continuation of application Ser. No. 149,033, filed June 1, 1971, now abandoned, which in turn was a continuation of application Ser. No. 751,911, filed Aug. 12, 1968, now abandoned.

This invention relates to apparatus for oscilloscope presentation of sheet profiles from a scanning gauge.

It has become an accepted practice in the paper industry (and to a less extent in the plastics industry) that when a sheet scanning gauge (e.g. a beta ray gauge) is used for measurement of weight or moisture of the sheet, the profile information is presented on an X-Y recorder as a series of traces one above another. In this way a pronounced streak in the paper will appear as repeated peaks in the traces at the same position along the scan axis.

This presentation has certain drawbacks. The X-Y recorder scanning mechanism is limited in its speed of operation and it is limited in its ruggedness to withstand continuous operation. The Y-axis response is likewise speed limited and generally not capable of quick recovery when input signals are switched from one measurement to another. In addition, there is perennial trouble with ink supplies, pen operation and chart renewal.

The present invention is designed to overcome these difficulties. The present invention replaces the X-Y recorder with a memory plus an electronic display system and the necessary signal processing to link these elements. This system performs the desired information presentation much faster while eliminating the troubles mentioned above.

In order to retain the ability to compare successive traces one above the other, a memory system is required to replace the inherent memory quality of a recorder trace. This memory system can be any system suitable to store information such as a tape memory, a disc or drum memory, a solid state digital system using a shift register or any other such device known in the art of information storage and retrieval. Because of the short term memory generally required for X-Y recording purposes, we have, in a practical embodiment of this invention, chosen a cathode ray oscilloscope with "long term" ("electronic storage") storage properties as the memory system. One example of such an oscilloscope is the Hewlett-Packard, HP141A. This oscilloscope provides the basic capability of accepting X and Y axis signals and presenting a sheet measurement profile which may be stored for a period up to several hours and hence a number of successive traces are readily displayed one above the other.

Since this oscilloscope has a small tube face not readily seen from some distance, and since this oscilloscope is a relatively expensive unit for use at repeated readout stations, we have employed a closed circuit TV system in conjunction with the storage oscilloscope.

In addition to the display of the scan trace, the writing capability of the C-R.O. may be used to add to the picture:

a. a line representing the average of the variable being measured. b. a set of marks providing horizontal and/or vertical scales on the tube face. c. identification markers to indicate which of several variables is being displayed at any one time.

Other objects, advantages and capabilities of the present invention will be apparent from the following detailed description, taken in conjunction with the accompanying drawings of the invention, wherein:

FIG. 1 shows the general scheme of the invention for presenting a visual display of measurement profiles obtained from a sheet scanning gauge;

FIG. 2 is a schematic diagram showing one form of signal processor which may be used with the invention;

FIG. 3 is a block diagram showing the elements of a line counter used with this invention;

FIG. 4 is a block diagram showing a second embodiment of the invention.

Referring to the drawings, reference numeral 10 indicates a moving sheet having a property, such as basis weight, moisture content, thickness, density, etc., which is subject to variation over the width and length of the sheet. The sheet may be a paper web emerging from the processing rolls 11 of a paper plant, however the invention is not limited to a sheet of any specific material as long as a desired property of the sheet can be measured by a scanning gauge of a suitable type. The nature of the sheet and the particular scanning gauge used for measuring a desired property of the sheet are not of importance because the invention primarily relates to a system for visual presentation of measurement profiles obtained from a scanning gauge of any type capable of producing electrical signals corresponding to the property being measured.

The term "measurement profile" as used herein refers to a continuous line plot of the values of the property being measured over the width of the sheet during one complete transverse scan of the sheet by the scanning gauge from one edge of the sheet to the other.

The scanning mechanism of the scanning gauge 12 shown in FIG. 1 includes a U-bracket 13 having vertically spaced upper and lower arms 13.1 and 13.2 which respectively extend over and under a moving sheet 10 in non-contacting relationship thereto. The bracket 13 is mounted on a fixed guide rail 14 for reciprocation over the width of the sheet 10 by means of a reversible electric scanning motor 15 actuated by a scanning motor control circuit 16. Reversing switches 17 and 18 are adjustably mounted on the guide rail 14 to send reversing control signals to the scanning motor control circuit 16 when the gauge housing 19 and 20 at the ends of the upper and lower bracket arms 13.1 and 13.2 respectively reach opposite edges of the sheet 10 being scanned. The switches 17 and 18 may be moved along the rail 14 to adjust for various sheet widths so that the housings 19 and 20 will travel from a minimum on-sheet position as shown by the full lines to a maximum on-sheet position as shown by the dotted lines 19a and 20a. The scanning mechanism per se as illustrated in FIG. 1 is not novel to this invention and various reciprocating scanning mechanisms are available which can be adapted for the purpose of transversely scanning a moving sheet. The scanning mechanism shown in FIG. 1 is of the type illustrated for example in U.S. Pat. No. 3,000,438 issued Sept. 19, 1961 to Frank M. Alexander and assigned to Industrial Nucleonics Corporation. A similar common scanning mechanism is the O-frame scanner in which the gauge heads are not rigidly attached but are driven across the sheet synchronously.

Within the housings 19 and 20 may be mounted the components of any suitable gauge for measuring a selected property or properties of the sheet 10. The gauge may be for example an infra red gauge such as shown in the Barker U.S. Pat. Nos. 3,207,901 and 3,228,282 for measuring basis weight of paper or the moisture content thereof. Another suitable gauge is the infra red gauge for measuring the basis weight and moisture content of paper webs as disclosed in the commonly assigned application of Donald C. Brunton, Ser. No. 439,301 filed Mar. 12, 1965 now U.S. Pat. No. 3,405,268 and commonly assigned. Numerous other suitable non-contacting gauges for measuring properties of sheet material are available from manufacturers such as Industrial Nucleonics, Electronic Automation Systems, Inc. Tracerlab Inc. and Ohmart Corporation to mention a few.

For the purpose of this description it will be assumed that an infra red gauge of one of the types disclosed in Barker U.S. Pat. No. 3,228,282 has been selected for use to measure the basis weight of paper, and/or the moisture content thereof. A source of infra red radiations is mounted in the lower gauge housing 20 and an infra red radiation detector is mounted in the upper housing 19. If basis weight of the paper alone is being measured, infra red radiations of a selected wave length which is not affected by moisture content of the paper but is partially absorbed in accordance with variations in the cellulose content of the paper is passed through the sheet 10 and is detected by a radiation detector such as phototube, in the upper housing. The intensity of radiations emerging through the paper and striking the detector are modulated by variations of the cellulose content of the paper, and the detector is capable of producing a fluctuating current corresponding to the fluctuations of intensity of radiations striking the detector. The fluctuating current from the phototube detector 21 is fed to gauge circuits indicated by block 22 in FIG. 1. These circuits, as described in Barker U.S. Pat. No. 3,228,282 comprise a load resistor, and amplifier which derive from the fluctuating current signal a voltage signal corresponding to the basis weight of the paper sheet 10. The instantaneous voltage output is a measure of the basis weight of that portion of the paper sheet over which the scanning gauge housings 19 and 20 are positioned at a particular instance.

The apparatus thus far described is basically old in the art, but its use prior to this invention in combination with the apparatus now to be described is not known by us. The output signal from the gauge 22 which is an instantaneous signal representative of the measured property can be fed directly to the Y-axis input terminal of a cathode ray oscilloscope 25 for display in accordance with this invention, but it is preferably fed to a signal processor 23 which may further process the signal in various ways.

FIG. 2 shows one preferred form of signal processor which compares the instantaneous value of the signal to its average value. The instantaneous input signal is fed to a resistor-capacitor circuit including a resistor 26 and a capacitor 27 with a time constant long enough to create an average value of the signal over any desired time, one scan for example; of several seconds. The output of the resistor-capacitor circuit goes to a high impedance unity gain amplifier 28 to prevent loading the resistor-capacitor circuit. The output of the amplifier 28 is the average value of the property being measured. The instantaneous signal and the average signal from the resistor-capacitor circuit are fed to a differential amplifier 29. The output from this amplifier is the difference between the two signals (i.e. the difference between the instantaneous sheet weight and the average sheet weight). The output from the differential amplifier 29 is fed through a resistor 30 to a chopper circuit that shorts the signal to ground about 30% of the time.

The chopper 31 is provided in the signal processor so that the y-axis terminal of the cathode ray oscilloscope may be alternately switched from the signal voltage to a reference voltage. In this way the actual measurement signal is displayed on the oscilloscope tube in relation to some reference value such as the average value of one or more scans or as is the case when using the signal processor shown in FIG. 2, the reference value is zero volts.

The output of the chopper 31 is added to a step voltage output from the line counter 32 in a summing amplifier 24. The step voltage from the line counter 32 provides display position signals which move the signals from the chopper 31 to a different line on the oscilloscope screen 25' each time the scanning gauge 12 reverses direction.

The line counter 32 (as shown in FIG. 3) consists of two flip-flops (single cycle multivibrators of known construction) and a monostable (ont shot) multivibrator 45. The flip-flop No. 1 is driven directly from the signals driving the scanning motor control 16. The output from the flip-flop No. 1 is fed to the toggle input of flip-flop No. 2, causing it to change state every time the flip-flop No. 1 output changes from positive to zero. The outputs from flip-flop No. 1 and No. 2 are fed through the resistors 43 and 44 respectively to the amplifier 24. The value of the second flip-flop's resistor 44 is half that of the first flip-flop's resistor 43, thus decreasing the Y axis signal and moving the trace down on the tube face each successive traverse of the scanning gauge until the erase signal produced by the monostable multivibrator 45 cleans off the tube and the whole process is repeated.

By including a flip-flop No. 3 which is triggered by the output pulse of flip-flop No. 2 and a selector relay 47 which is actuated by the output pulse from flip-flop No. 3, the equipment is adapted to display sets of different measurement signals, such as weight and percent moisture, alternately. When the display is switched from weight display to percent moisture display or vice versa the display also erases.

The display oscilloscope 25 is preferably a storage type cathode ray oscilliscope with an electronic memory so that a picture on the oscilloscope screen 25' may be stored for a period of time (generally up to several hours). Examples of suitable storage type oscilloscopes which are presently commercially available are the Hewlett-Packard Company HP 141 A oscilloscope and the Tektronic No. 549.

The oscilloscope 25 includes in addition to the Y input terminal and the erase command terminal already mentioned, an X-axis terminal and a Z terminal. A horizontal sweep voltage is applied to the X-axis terminal which causes the cathode ray beam to sweep horizontally across the tube in a well known manner. The horizontal sweep voltage is designated in FIG. 1 as the O-frame position signal since it varies in accordance with the position of the scanning gauge relative to the sheet 10. The O-frame position signal is a voltage derived from a potentiometer 33 which is driven by the scanner motor 15 through suitable drive mechanism indicated by the dotted line 35 and including reduction gears 36 and 37. The potentiometer 33 driven by the gear box 37 transmits scanning gauge position information to the X-axis amplifier 38 which amplifies the signal and sends the amplified signal on to the X-axis terminal of the oscilloscope 25. The voltage applied to the X-axis terminal becomes the sweep voltage for the cathode ray oscilloscope tube and moves the spot across the screen 25' as the scanning gauge 12 moves across the sheet 10.

The Z-axis terminal of the oscilloscope 25 is supplied with equally spaced marker pulses which are generated by an interrupt switch 39 making and breaking a circuit between a power supply (−100V) and the Z-axis terminal. The interrupt switch 39 is driven by the scanning motor 15 through the gear box 36 and shaft 35 so that it closes the circuit between the Z-axis terminal and the −100V supply for a few degrees every revolution. When the switch 39 is closed the trace on the oscilloscope is brightened or darkened providing markings on the X-axis of the oscilloscope which are representative of the scanning gauge position as it scans.

Markers may also be put into the system by using an illuminated marker screen across the face of the cathode ray tube.

Where remote observation of the oscilloscope display is desired at one or more remote stations a closed circuit television system consisting of a television camera 40 directed toward the oscilloscope screen 25' and one, or more television receivers or cathode ray tube monitors 41 located at the remote stations may be provided.

The equipment can also be used to display measurement profiles of different properties such as weight and per cent moisture alternately. In this case the erase pulse from the line counter 32 can also be used to trigger a flip-flop circuit (not shown) that changes the display from the values of one property to the values of the other. When the display is switched from one property to another the previous display is erased.

While a storage oscilloscope has been described by way of example in the illustrated embodiments as the memory device for storing plural measurement profiles so that they can be compared, other memory devices using magnetic cores, delay lines, shift registers, magnetic tapes, disc, solid state digital storage units or other memory systems can be used. The information stored on any one of the memory devices suggested above can be readout by suitable readout means and fed to oscilloscopes or television receivers at remote stations for observation.

In FIG. 4 a second embodiment of the invention is shown wherein a magnetic disc memory system is used to store the process signal. A process signal from a scanning gauge 22 as shown in FIG. 1 is fed to a voltage to frequency converter 50 wherein the voltage signal is converted into a frequency signal. The frequency signal from the voltage to frequency converter is fed through a recorder mode switch 51 to a magnetic recorder head 55 which during the record mode impresses the frequency signal on the rotating magnetic disc 52. The magnetic disc 52 and a position indicating disc 53 are fixedly mounted on a shaft 54' driven by the disc drive motor 54. The recorder mode switch is controlled by command signals from a logic system 57 which knows the position of the disc 52 and the current position of the scanning gauge head because of gauge head position signals and disc position signals being fed into the logic system. The disc position sensor 56 may be a photoelectric, a magnetic, or other type sensor adapted to read position marks of a suitable nature appearing on the position indicator disc 53. Signals from the disc position sensor 56 are continuously fed to the logic system 57 and to the X axis terminal of oscilloscopes 59, and 60a.

The recorder mode switch 51 is commanded to record the frequency signal during the instant the disc 53 is at the position corresponding to the current position of the gauge head and the profile being recorded. At all other times the recorder mode switch is in a playback mode and the recorder pick up 55 picks up signals recorded on the magnetic disc 52 and feeds these signals to a frequency to voltage converter 58. The frequency to voltage converter 58 converts the frequency signals from the magnetic disc 52 to voltage signals and feeds the voltage signals to the Y-axis terminals of the oscilloscopes 59, and 60a. The voltage signal at any instant corresponds to the instantaneous value of a property of sheet being measured at a particular position on the sheet. The voltage signals applied at the Y-terminal of an oscilloscope create a trace across the oscilloscope which is a profile of the property within the sheet being measured. An X-axis signal from the disc position sensor 56 is also fed to oscilloscopes 59, and 60a. The sweep for the oscilloscope is once for each profile.

A particular advantage of the magnetic disc or similar memory system is the ability to store the successive information from a number of scans and then send to the oscilloscope one profile which is the summation or the average of a number of profiles.

The small oscilloscope 59 may be used in conjunction with a television camera 61 which reads the display on the oscilloscope tube and transmits the display to a television receiver set 62 at a remote location by a closed circuit TV system. Likewise, if desired, remote oscilloscopes 60a can be used for display at distant points.

In another option for remote display, the signals normally fed to the X and Y terminals of the oscilloscope 59 can be fed to voltage comparators which in conjunction with a sync generator and crystal oscillator 65 generate an artificial TV signal which can be sent via cable 66 to a remote television receiver (not shown).

Other modifications and variations of the present invention are possible in the light of the above teaching; accordingly it is not desired to limit the invention to the present disclosure and various modifications and equivalents may be resorted to falling within the spirit and scope of the invention as claimed.

What is claimed is:

1. A system for obtaining and simultaneously displaying a plurality of measurement profiles taken at intervals across a moving sheet, comprising:
   means for making successive transverse scans across said moving sheet at longitudinally spaced intervals therealong, and measuring means associated with said scanning means for measuring a selected property of said sheet and producing electrical signals whose instantaneous value is representative of said selected property at the transverse point of measurement;
   a cathode ray oscilloscope having a screen; means for producing successive cathode ray sweeps across said oscilloscope screen, means synchronized with said measuring scanning means for correlating said sweeps with the scans of said sheet, and sweep deflection means responsive to said electrical measurement signals for orthogonally deflecting each point on successive sweeps a representative deviation from a reference base whereby measurement profiles of said sheet are traced in succession on said oscilloscope screen;

means for maintaining a residual simultaneous display of successive multiple traces on said oscilloscope screen over a predetermined period of time; and programming means for displacing said simultaneous residual display a successive measurement profiles on successive traces of said cathode ray oscilloscope screen with respect to each other.

2. The system of claim 1 further including signal storage means interposed between said measuring means and said cathode ray oscilloscope for storing electrical signals produced by said measuring means.

3. The apparatus set forth in claim 2 wherein said means interposed between said measuring means and said oscilloscope for storing electrical signals produced by said measuring means further includes means for retrieving said stored electrical signals and applying the retrieved electrical signals to said oscilloscope.

4. A system for obtaining and simultaneously displaying a plurality of measurement profiles taken at intervals across a moving sheet, comprising means for making successive scans across said moving sheet at longitudinally spaced intervals therealong, measuring means associated with said scanning means for measuring a selected property of said sheet as said sheet is being scanned and producing electrical signals whose instantaneous amplitude is a function of said selected property for a particular portion of said sheet being scanned at a given instant, a storage cathode ray oscilloscope means responsive to said electrical signals for visually tracing in succession the measurement profiles of said sheet and maintaining a residual simultaneous display of multiple traces over a predetermined period of time, each measurement profile being displayed as a line trace and each point on said trace being an amplitude deviation from a reference base, said oscilloscope means having a storage cathode ray tube, sweep means responsive to a sweep voltage for normally producing successive linear cathode ray sweeps across said cathode ray tube, and sweep deflection means responsive to said electrical measurement signals for deflecting successive sweeps in accordance with the measurement profiles of said sheet, means synchronized with said scanning means for supplying the sweep voltage to said oscilloscope sweep means, and programming means for vertically displacing visual traces of successive measurement profiles on said cathode ray oscilloscope tube with respect to each other.

5. The system set forth in claim 4 wherein said programming means include line counting means for counting successive transverse scans made by said scanning means across said sheet and producing a signal after each scan for vertically displacing the cathode ray tube trace for the next succeeding scan from the trace of the preceding scan.

6. The system set forth in claim 5 wherein said line counting means includes reset means for returning said trace to a predetermined level on said cathode ray tube after a predetermined number of scans.

7. The system set forth in claim 6 wherein said line counting means includes an erase command signal generating means for generating an erase command signal for erasing residual displays on said cathode ray tube.

8. The system set forth in claim 7 wherein said erase command signal generating means and said reset means operate simultaneously to erase residual traces on said cathode ray tube and return the next trace to said predetermined level.

9. Apparatus for displaying information indicative of a moving sheet, said information being simultaneously displayed for different cross sheet locations of the sheet, comprising gauge means for monitoring at least one property of the moving sheet, means for scanning the gauge means in a direction between the edges of the moving sheet, means responsive to the gauge means for simultaneously storing plural signals each having amplitude variations indicative of the monitored at least one property at different cross sheet locations, an electronic optical display having electrodes and a face for providing a display in a pair of orthogonal X and Y axes in response to energization of the electrodes, means responsive to the storing means for activating the electrodes so that on the face there are simultaneously displayed different visual traces that are two dimensional replicas of variations of more than one of the plural stored signals, the electrodes being energized so that: the different traces have different, substantially parallel reference positions extending along the X axis of the face, said different cross sheet locations being represented by different positions along the X axis, different reference positions being at different Y axis positions, and each of the traces is displaced along the Y axis from the reference position for the trace by an amount commensurate with the amplitude of the stored signal corresponding to the trace at X axis locations corresponding with the cross sheet locations of the gauge means.

10. The apparatus of claim 9 wherein said electronic optical display comprises a television receiver having a cathode ray tube.

11. The apparatus of claim 9 wherein the gauge means includes means for monitoring a plurality of properties of the moving sheet, and means for coupling signals indicative of the plural monitored properties from the gauge means to the means for storing so that the different monitored properties are displayed.

12. The apparatus of claim 9 wherein the gauge means is scanned in a direction between the edges of the moving sheet a plurality of times, whereby the means for storing simultaneously stores signals for several different scans and the plural signals stored by the means for storing are for different machine direction locations of the sheet, said means for activating the electrodes including means for energizing the electrodes so that different ones of the plural signals for the different machine direction locations are displayed as the different traces.

13. The apparatus of claim 12 wherein the means for activating the electrodes includes means for simultaneously displaying the different traces so that the same cross sheet locations of the different traces are represented by substantially the same X axis positions.

14. The apparatus of claim 9 wherein the means for activating the electrodes includes means for simultaneously displaying the different traces so that the same cross sheet locations of the different traces are represented by substantially the same X axis positions.

15. The apparatus of claim 9 wherein the gauge means is scanned in a direction between the edges of the moving sheet a plurality of times, said means for storing including means for storing signals from a number of scans, and means responsive to the stored signals from the number of scans for activating the display means to display one trace indicative of an accumulation of signals from a number of the scans, whereby the one trace is displaced along the Y axis from the reference position for that trace by an amount commensurate with the amplitude of the one trace at X axis locations corresponding with the cross sheet locations of the gauge means.

16. The system set forth in cliam 9 together with means for displaying a scale on said cathode ray tube screen superimposed on said visual traces.

17. The system set forth in claim 16 wherein said scale marks increments of distance corresponding to distances across said sheet from a selected edge thereof.

18. The system set forth in claim 16 wherein the scale producing means includes an external programming system for producing electric scale marking pulses, and electronic scale producing means responsive to said marking pulses to enable said scale to be visually produced and superimposed on said visual traces.

19. The system set forth in claim 18 wherein said activating means comprises a voltage source, and means for periodically connecting said voltage source to said electronic scale producing means at intervals corresponding to equally spaced distances of movement of said gauge means across said sheet from a selected reference point.

20. The system set forth in claim 9 together with externally controlled means for erasing said stored signals at preselected intervals.

21. The system set forth in claim 20 wherein said externally controlled means for erasing said stored signals is controlled by a line counting means for counting successive scans made by said gauge means across said sheet and producing an erase command signal after a predetermined number of scans.

22. The system set forth in claim 9 together with electronic means for producing a visual reference trace on said screen at each Y axis position corresponding with each reference position, whereby each stored signal visual trace can be compared with each reference trace.

23. The system set forth in claim 22 wherein said means for producing a reference trace includes means for generating a reference voltage and switching means for alternately connecting said reference voltage and said measurement signal to said means for storing for successive intervals during the traverse of said scanning means across said sheet.

24. The apparatus set forth in claim 9 wherein said means for storing electrical signals produced by said scanning measuring means is a magnetic memory device.

25. The apparatus as set forth in claim 9 wherein said storage means for storing measurement signals produced by said gauge means stores a summation of said signals for a plurality of scans made by gauge means, together with means for retrieving said stored signals on command.

26. The apparatus set forth in claim 25 wherein said retrieved signals are visually displayed as a summation of a number of scans.

27. The apparatus set forth in claim 25 wherein said retrieved signals are visually displayed as an average profile of a number of scans.

28. The apparatus set forth in claim 3 wherein said means for storing electrical signals produced by said scanning measuring means stores a summation of said electric signals for a plurality of scans made by said scanning measuring means, together with programming means for automatically actuating said means for retrieving said stored electrical signals.

29. The apparatus set forth in claim 28 wherein said retrieved electric signals are visually displayed as a summation of a number of scans.

30. The apparatus set forth in claim 28 wherein said retrieved electric signals are visually displayed as an average profile of a number of scans.

* * * * *